(12) United States Patent
Fujisawa et al.

(10) Patent No.: US 10,178,116 B2
(45) Date of Patent: Jan. 8, 2019

(54) AUTOMATED COMPUTER BEHAVIORAL ANALYSIS SYSTEM AND METHODS

(71) Applicant: Soliton Systems K.K., Tokyo (JP)

(72) Inventors: Tetsuo Fujisawa, Los Alamitos, CA (US); Cheree James, Tokyo (JP); Tedd Hadley, Redwood City, CA (US); Jay C. Kim, Cupertino, CA (US)

(73) Assignee: SOLITON SYSTEMS K.K., Tokyo (JP)

( * ) Notice: Subject to any disclaimer, the term of this patent is extended or adjusted under 35 U.S.C. 154(b) by 158 days.

(21) Appl. No.: 15/445,883

(22) Filed: Feb. 28, 2017

(65) Prior Publication Data

US 2017/0251007 A1 Aug. 31, 2017

Related U.S. Application Data

(60) Provisional application No. 62/301,474, filed on Feb. 29, 2016.

(51) Int. Cl.
*H04L 9/00* (2006.01)
*H04L 29/06* (2006.01)

(52) U.S. Cl.
CPC ...... *H04L 63/1425* (2013.01); *H04L 63/0272* (2013.01)

(58) Field of Classification Search
CPC .................. H04L 63/1425; H04L 63/0272
See application file for complete search history.

(56) References Cited

U.S. PATENT DOCUMENTS

| 8,700,487 | B2* | 4/2014 | Grass ................ G06Q 30/0609 |
| | | | 705/26.35 |
| 9,973,525 | B1* | 5/2018 | Roturier ............. H04L 63/1433 |
| 2008/0183745 | A1* | 7/2008 | Cancel .................. G06Q 30/02 |
| 2015/0205954 | A1 | 7/2015 | Jou et al. |
| 2016/0306965 | A1* | 10/2016 | Iyer ...................... G06F 21/552 |

OTHER PUBLICATIONS

Association of Certified Fraud Examiners (ACFE), "Report to the Nations on Occupational Fraud and Abuse," ACFE Website, (2014). [Retrieved from the Internet May 1, 2017: https://www.acfe.com/rttn/docs/2014-report-to-nations.pdf].

* cited by examiner

*Primary Examiner* — Beemnet W Dada
(74) *Attorney, Agent, or Firm* — Alston & Bird LLP

(57) ABSTRACT

Events related to an end-point connected with one or more devices are recorded and collected to observe end-point behavior and determine the risk of unfavorable conduct occurring on a network/system. The analysis may include a behavioral analysis that matches events to behaviors, and scores behaviors along factors or parameters of fraud including opportunity (O), pressure (P), and rationalization (R). Malicious behavior may be anticipated or identified prior to commission, allowing preventative measures to be taken or behavior intercepted within the early stages.

20 Claims, 17 Drawing Sheets

600

| Event Type | Event Attribute |
|---|---|
| Running Process | Name, Hash, PID, GUID |
| File Access | Name, Folder, Hash |
| Network Access | Website, IP Address, URL name, Port |
| Activities | WPD, Active Window, Printer, USB, Device Mount |
| Registry | Key, Value |
| Privilege | Domain User Privileges, Local User Privilege |
| Clip Board | Contents of Clip Board |
| Keyword Search of Websites | Inputs Keywords |

| | Indicator of Behavior: Opportunity (O) |
|---|---|
| a | A user's downloading of sensitive files to a portable storage device |
| b | A user's deviation from his/her behavior profile by uncharacteristically accessing a number of sensitive information sources |
| c | Storage of a significant number of files on the user's local hard drive when they are available as a network resource. |
| d | Indication that a user has tried and failed at least three times to access shared files on a server for which he/she does not have regular access permissions |
| e | A user concurrently opening multiple pictures and documents |
| f | Outbound web connections from an administrator account on an internal host to an overseas destination involving file transfers |
| g | Failed or successful attempts to circumvent auditing (deleting log files) |
| h | Inputs of keywords related to "Opportunity" in website search |
| i | Access to the website related to fraud methods |
| j | Access to the website related to destruction of evidence |

| | Indicator of Behavior: Pressure/Incentive (P) |
|---|---|
| a | PC usage during off hour with Reugular application in use |
| b | Inputs of keywords related to "Pressure/Incentive" in website search |
| c | Access to stress related website |
| d | Access to the website related to resignation and change of job |
| e | Access to gamble websites |
| f | Access to the website related to alcoholic drinks |
| g | Access to narcotic drug websites |
| h | Access to adult websites |
| i | Many accesses to websites as a whole (more than 20 domains per hour) |
| j | Many interruptions of PC operation (more than 10 times per hour) |

|   | Indicator of Behavior: Rationalization (R) |
|---|---|
| a | Access to social websites during normal hours |
| b | Access to outside file shares via VPN |
| c | Inputs of keywords related to "Rationalization" in website search |
| d | Access to shopping, Restaurant, Travel, Sport, Hobby websites |
| e | Access via Private Browsing |
| f | Download of music files |
| g | Deleting all web History |
| h | Copy files to local folders not in network |
| i | Utilization of the unauthorized encryption software |
| j | Use of screen captuure with sensitive data file open |

Criminal Psychology Statistics

| | Profile | Category Example | Risk by Category |
|---|---|---|---|
| 1 | Position | Employee, Manager, Executive | |
| 2 | Regional Information | | |
| 3 | Type Scheme per Position | Corruption, Billing, Expense Reimbursement, Payroll, Financial Statement | |
| 4 | Age | ~26, 26~30~35~40~45~50~55~60~ | |
| 5 | Damage per Age | | |
| 6 | Gender by Region | | |
| 7 | Tenure in Position | ~1 year~5 years~10 years~ | |
| 8 | Department | Accounting, Operation, Sales, Upper Management | |
| 9 | Fraud Scheme by Department, Region | | |
| 10 | Red-Flag Display | Living beyond means, Financial Difficulties, Vendor/Association, Vendor/Customer | |

FIG. 13

Human Resource Database

| | Profile | Category Example | Risk by Category |
|---|---|---|---|
| 1 | Employee Name | John Smith | |
| 2 | Employee ID | 002500 | |
| 3 | Position | Manager | |
| 4 | Regional Information | California | |
| 5 | Type Scheme per Position | Corruption, Billing, Expense Reimbursement, Payroll, Financial Statement | |
| 6 | Age | 30~35 | |
| 8 | Gender by Region | Male | |
| 9 | Tenure in Position | 5 years~10 years | |
| 10 | Department | Sales | |
| 12 | Red-Flag Display | n/a | |

| Opportunity/Access | | | Scoring | Level |
|---|---|---|---|---|
| 1 | User logs on to Finance/Accounting server and HR server | | 0.3 | |
| 2 | User logs on to Facebook and Twitter and LinkedIn | ←—1502 | 0.1 | |
| 3 | User plugs in 2 separate times USB drive | | 0.1 | |
| | Opportunity/Access Running Total | | 0.5 | "Yellow" |

| Pressure/Activity | | | | |
|---|---|---|---|---|
| 4 | User initiates 7 search queries on Finance/Accounting server | | 0.3 | |
| 5 | User concurrently opens 4 files | | 0.1 | |
| 6 | User creates 3 compressed files (ZIP, RAR, TAR, etc.) | ←—1504 | 0.1 | |
| 7 | User is working outside normal hours | | 0.1 | |
| 8 | User initiates 5 screen captures | | 0.1 | |
| 9 | User concurrently deletes 6 files | | 0.1 | |
| | Pressure/Activity Running Total | | 0.8 | "Red" |

| Rationalization/Action | | | | |
|---|---|---|---|---|
| 10 | User downloads 2 materials from HR server | | 0.3 | |
| 11 | User saves 8 files to USB drive | ←—1506 | 0.2 | |
| 12 | User prints 12 files | | 0.1 | |
| 13 | User sends 5 emails with attachment to same person or entity | | 0.2 | |
| | Rationalization/Action Running Total | | 0.8 | "Red" |

| Search and Website | | | | |
|---|---|---|---|---|
| 14 | User searches 1 time for "cover up" | | 0.1 | |
| 15 | User searches 4 times for "making quota" | ←—1508 | 0.1 | |
| 16 | User types in 2 times URL's for "gambling" websites | | 0.3 | |
| | Search and Website Running Total | | 0.5 | "Yellow" |

OPR = (Access Weight x Access Score) + (Activity Weight x Activity Score) + (Action Weight x Action Score)
↘—1510

| Risk Score Weight 1512 | |
|---|---|
| Access | 0.25 |
| Activity | 0.30 |
| Action | 0.45 |
| OPR Risk Score = | 0.73  "Red" |

1514

User Risk Score = (OPR Weight x OPR Score) + (Search/Website Weight x Search/Website Score)
↘— 1516

| Risk Score Weight 1518 | |
|---|---|
| OPR/AAA | 0.75 |
| Search/Web | 0.25 |
| User Risk Score = | 0.67  "Yellow" |

| Category | Type | Frequency |
|---|---|---|
| Position | Employee | 0.4200 |
| Gender | Male | 0.6700 |
| Tenure | 1-5 years | 0.4070 |
| Age | 41-45 | 0.1810 |
| Department | Accounting | 0.1740 |
| | | |
| Profile Risk Score | 0.0036070015 | |
| Highest Profile Risk Score | 0.0036070015 | |
| Normalized Risk Score | 100 | |

| Category | Type | Frequency |
|---|---|---|
| Position | Owner/Executive | 0.1900 |
| Gender | Female | 0.3300 |
| Tenure | > 10 years | 0.2520 |
| Age | 41-45 | 0.1810 |
| Department | Operations | 0.1530 |
| | | |
| Profile Risk Score | 0.0004375605 | |
| Highest Profile Risk Score | 0.0036070015 | |
| Normalized Risk Score | 12.13086478 | |

| Category | Type | Frequency |
|---|---|---|
| Position | Manager | 0.3600 |
| Gender | Male | 0.6700 |
| Tenure | 1-5 years | 0.4070 |
| Age | 26-30 | 0.1130 |
| Department | Legal | 0.0060 |
| | | |
| Profile Risk Score | 0.0000665582 | |
| Highest Profile Risk Score | 0.0036070015 | |
| Normalized Risk Score | 1.845249435 | |

FIG. 16C

| Categories | Frequency |
|---|---|
| Position | |
| Employee | 42% |
| Manager | 36% |
| Owner/Executive | 19% |
| Gender | |
| Male | 67% |
| Female | 33% |
| Tenure | |
| < 1 Year | 6.8% |
| 1-5 Years | 40.7% |
| 6-10 Years | 27.3% |
| > 10 Years | 25.2% |
| Age | |
| <26 | 3.9% |
| 26-30 | 11.3% |
| 31-35 | 15.9% |
| 36-40 | 17.6% |
| 41-45 | 18.1% |
| 46-50 | 14.6% |
| 51-55 // 56-60 // >60 | 9.8% // 5.4% // 3.4% (respectively) |
| Department | |
| Accounting | 17.4% |
| Operations | 15.3% |
| Sales | 12.5% |
| Executive/Upper Management | 11.8% |
| Other | 7.9% |
| Customer Service | 7.7% |
| Purchasing | 7.2% |
| Finance | 5.2% |
| Warehousing/Inventory | 3.9% |
| Information Technology | 3.0% |
| Manufacturing and Production | 2.5% |
| Marketing/ Public Relations | 1.3% |
| Human Resources | 1.2% |
| Board of Directors | 1.0% |
| Research and Development | 1.0% |
| Legal // Internal Audit | 0.6% // 0.5% (respectively) |

FIG. 17

AUTOMATED COMPUTER BEHAVIORAL ANALYSIS SYSTEM AND METHODS

RELATED APPLICATIONS

This application claims the benefit of priority to Provisional Patent Application No. 62/301,474 filed Feb. 29, 2016 entitled "Automated Computer Behavior Analysis System and Methods."

FIELD

Embodiments of the invention relate, generally, to techniques for securing computing environments.

BACKGROUND

Cybersecurity solutions are designed to address computer intrusions and in doing so, applies technology designed to address the detection and response of malicious behavior that occurs in a computer network. Automated prevention and protection measures are immature and are heavily reliant on human analysis to recognize and react to suspicious activity.

Automated fraud analytics are currently being employed (e.g., by large accounting firms), however these processes analyze data in "unstructured formats" where the application of plain text keyword searches can recognize textual patterns within emails, communications and documents. Therefore, the shortcoming in automated fraud detection is the inability to analyze "structured data" that exists in non-human readable formats. Furthermore, there is a need for systems to monitor cybersecurity threats in real-time and provide timely remedial action.

BRIEF SUMMARY

Through applied effort, ingenuity, and innovation, solutions to improve such systems have been realized and are described herein. Some embodiments may provide for techniques that allow an enterprise to identify intentional or unintentional malicious activity on computing systems.

Advantageously, the risks of occupational fraud, when fraudsters use computers to commit fraud, can be identified prior to or early in the commission of fraudulent activity. The determination of suspicious behaviors can be based on algorithms that indicate probability of fraudulent activity. Computer activity exists as individual events that are void of any contextual relationship between disparate artifacts. By categorizing individual events and applying context between disparate items, it is possible to apply automated detection engines that consider and recognize patterns using a weighting system that computes risk and probability.

Various embodiments of the present invention are directed to improved apparatuses, methods, and computer readable media for securing a networked endpoint connected with one or more devices. Some embodiments may include methods, while other embodiments may include circuitry and/or media configured to implement the methods and/or other functionality discussed herein. For example, one or more processors, and/or other machine components may be configured to implement the functionality discussed herein based on instructions and/or other data stored in memory and/or other non-transitory computer readable media.

These characteristics as well as additional features, functions, and details of various embodiments are described below. Similarly, corresponding and additional embodiments are also described below.

BRIEF DESCRIPTION OF THE DRAWINGS

Figure 1:
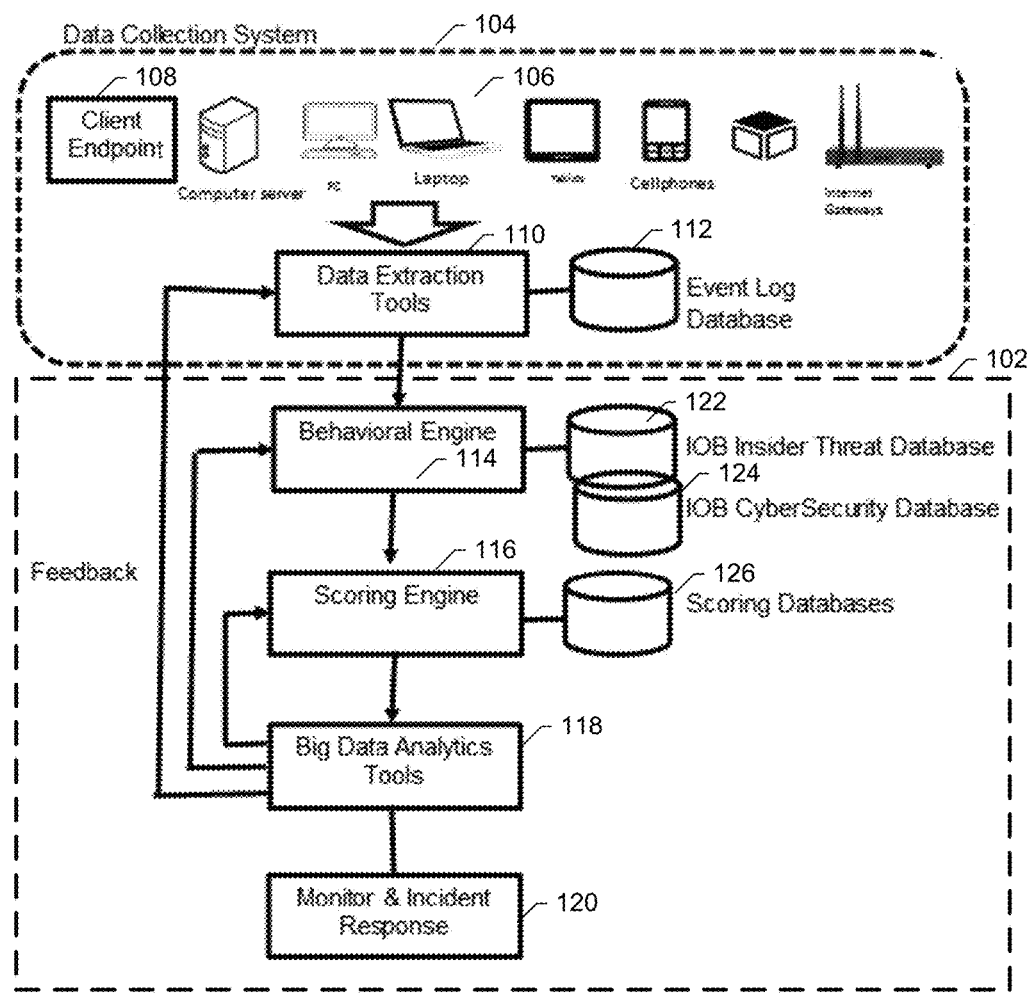
Figure 2:
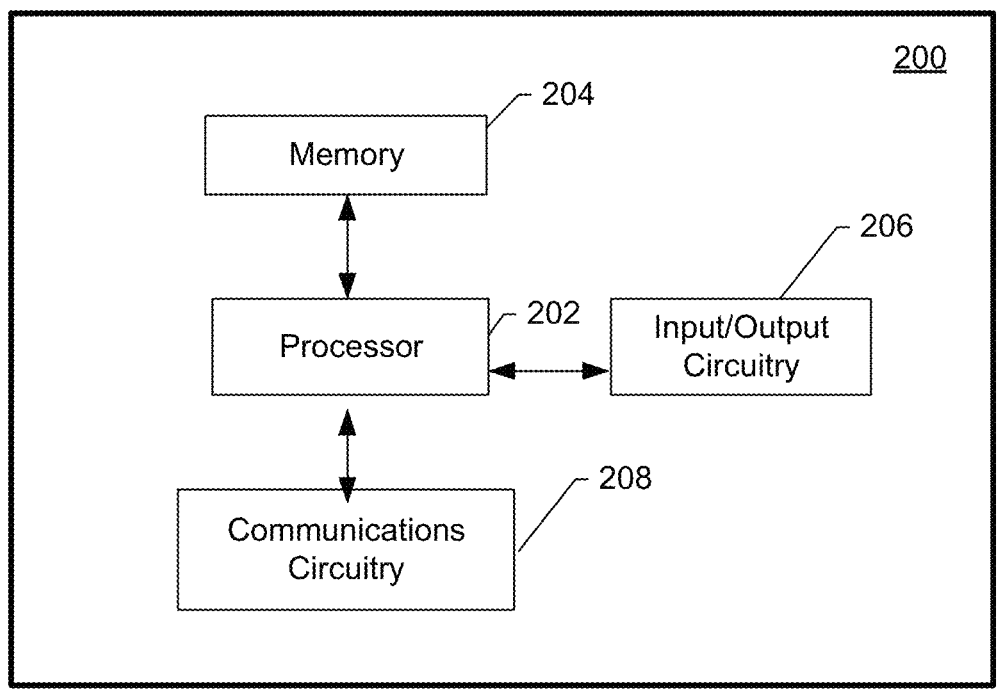
Figure 3:
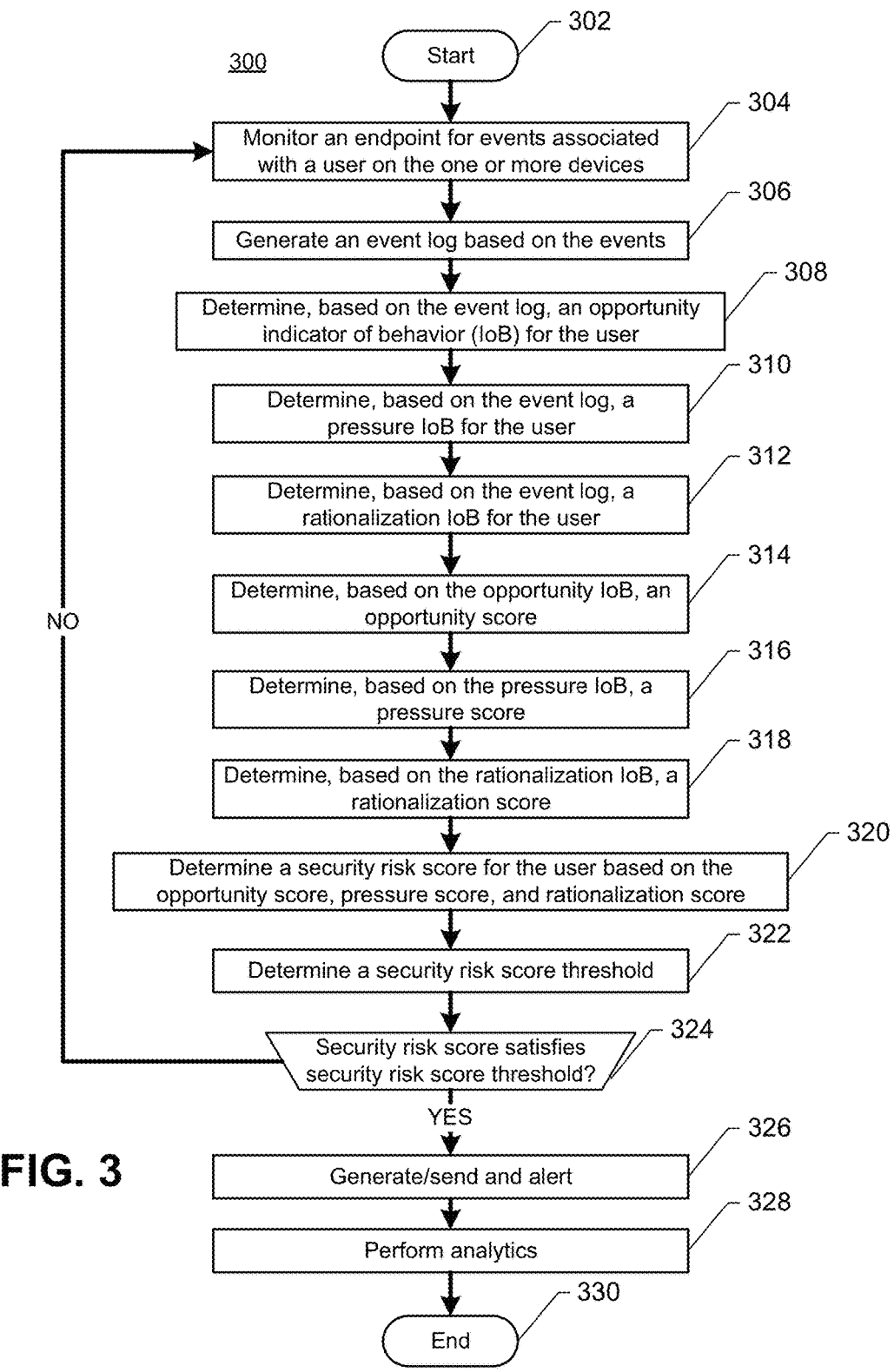
Figure 4:
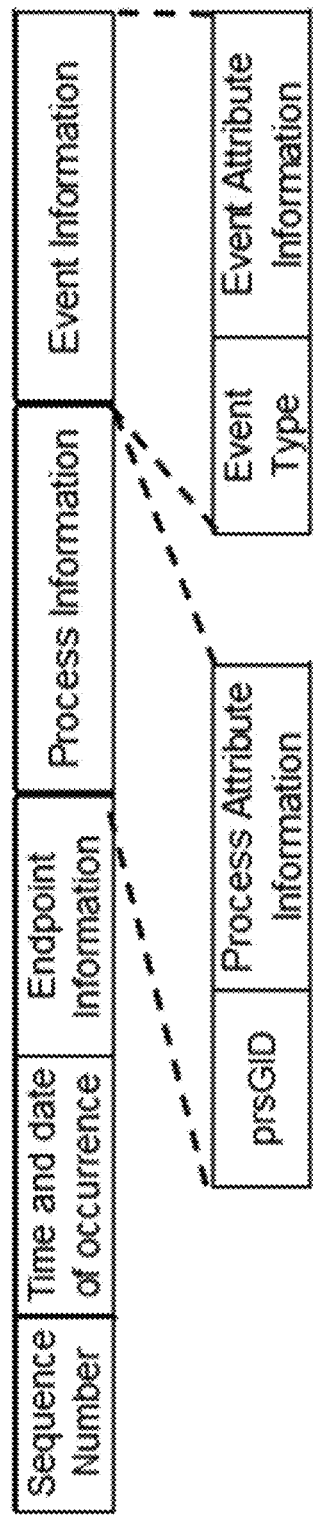
Figure 5:
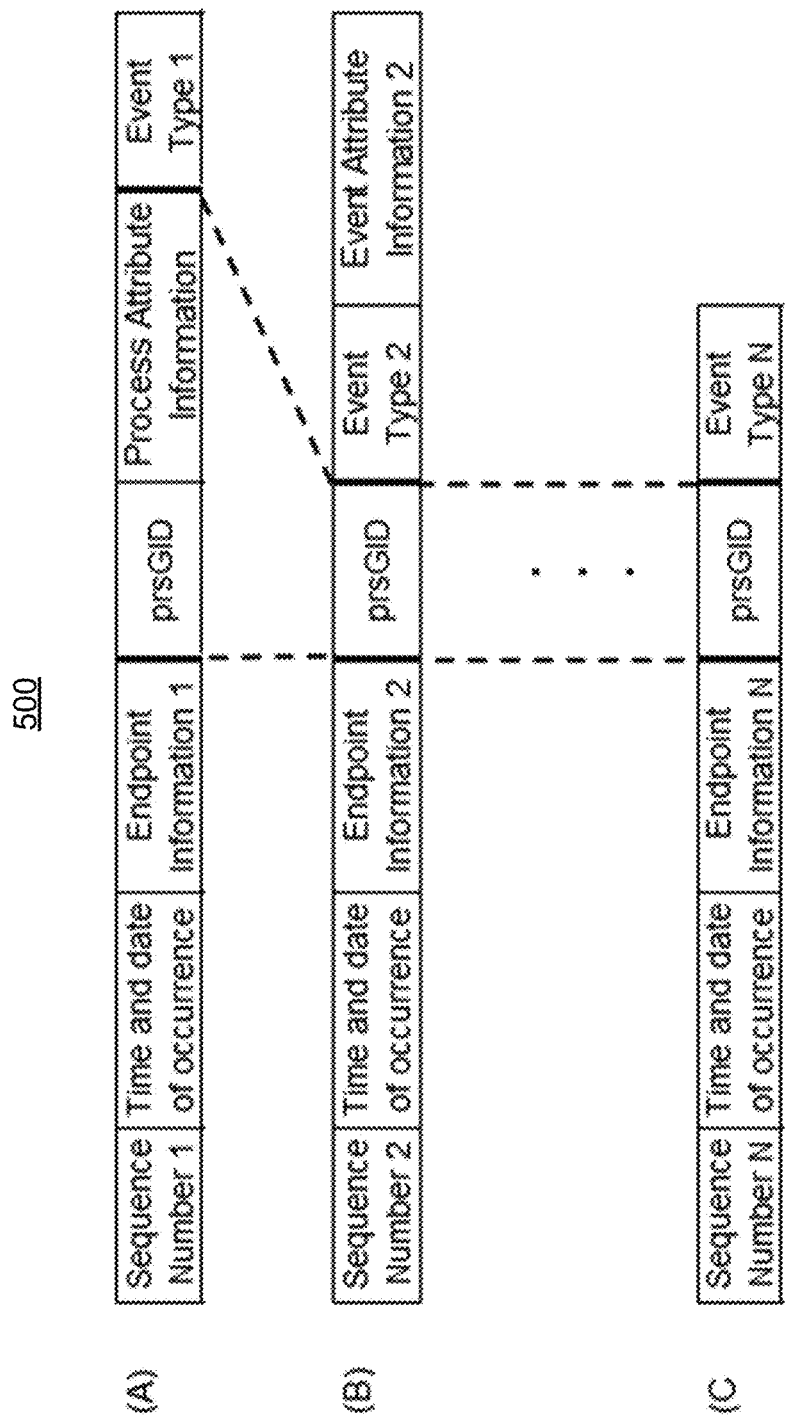
Figure 7:
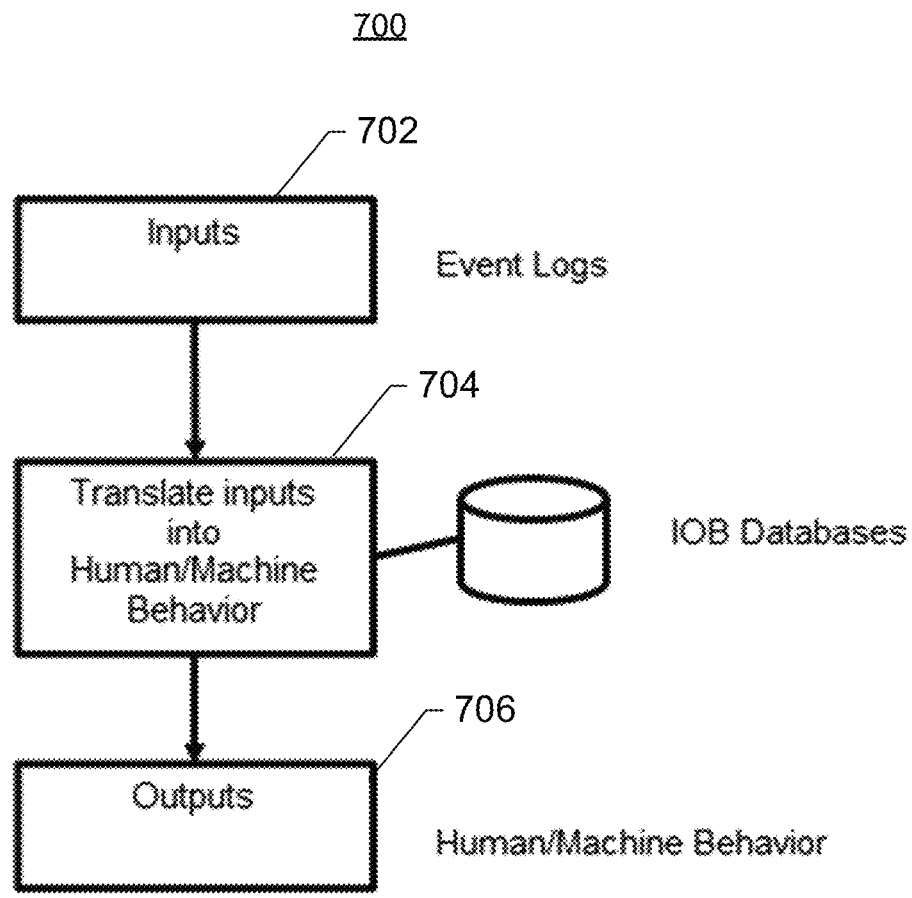
Figure 11:
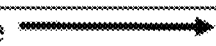
Figure 12:
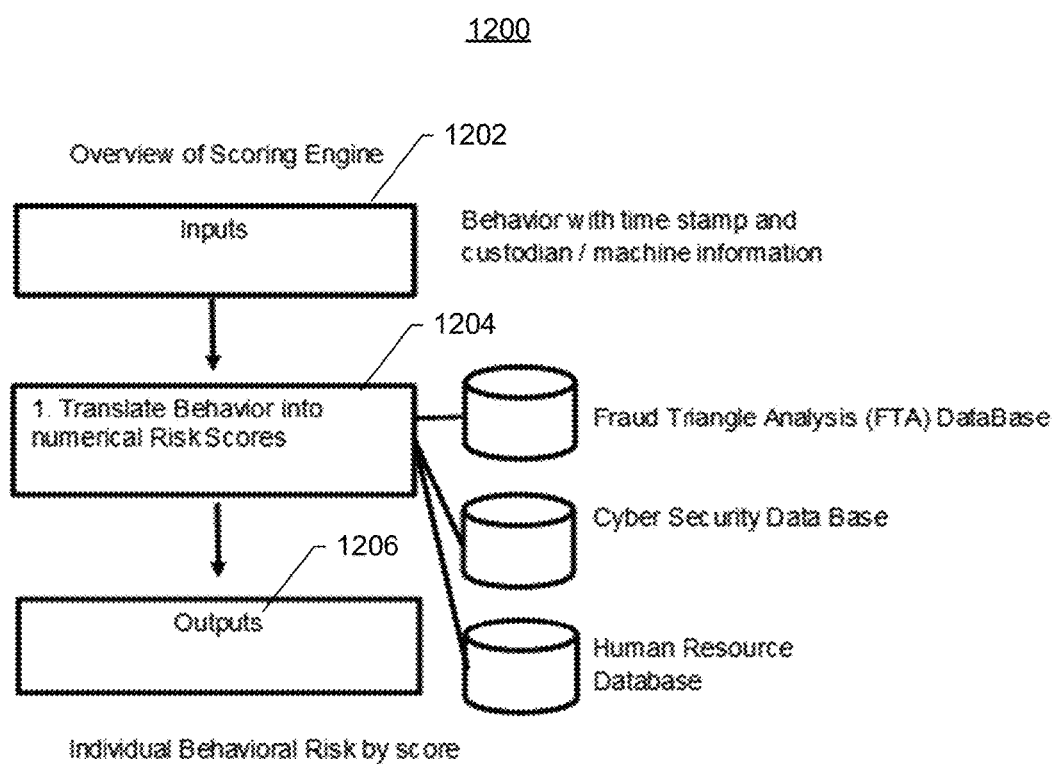

Having thus described some embodiments in general terms, reference will now be made to the accompanying drawings, which are not necessarily drawn to scale, and wherein:

FIG. 1 shows an example of a system in accordance with some embodiments;

FIG. 2 shows a schematic block diagram of example circuitry in accordance with some embodiments;

FIG. 3 shows a flow chart of an example of a method for securing a networked endpoint including one or more devices, in accordance with some embodiments;

FIG. 4 shows an example of event data structure, in accordance with some embodiments;

FIG. 5 shows an example of an event log, in accordance with some embodiments;

FIG. 6 shows examples of monitored events, in accordance with some embodiments;

FIG. 7 shows a flow chart of an example of a method for determining indicators of behavior (IoBs) based on event log, in accordance with some embodiments;

FIG. 8 shows examples of opportunity IoBs, in accordance with some embodiments;

FIG. 9 shows examples of pressure IoBs, in accordance with some embodiments;

FIG. 10 shows examples of rationalization IoBs, in accordance with some embodiments;

FIG. 11 shows examples of a time series of IoBs, in accordance with some embodiments;

FIG. 12 shows a flow chart of an example of a method for determining security risk scores based on IoBs, in accordance with some embodiments;

FIG. 13 shows examples of security user data, in accordance with some embodiments;

FIG. 14 shows examples of human resource data, in accordance with some embodiments;

FIG. 15 shows examples of opportunity, pressure, and rationalization scores and various algorithm calculations, in accordance with some embodiments;

FIG. 16A shows an example of a baseline risk profile, in accordance with some embodiments;

FIG. 16B shows an example user risk profile, in accordance with some embodiments;

FIG. 16C shows an example user risk profile, in accordance with some embodiments; and FIG. 17 shows an example of risk by categories, in accordance with some embodiments.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

System Architecture and Example Apparatus

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more devices of a networked endpoint.

In this regard, FIG. 1 shows an example computing system 100 within which embodiments of the present invention may operate. The computing system 100 may include a computer behavior analysis system (or "analysis system") 102 and a data collection system 104. The analysis system 102 may be configured to provide end point security services for a network (e.g., corporate or organization) that is accessed by one or more devices. These devices may be remote or local to the analysis system 102. For example, devices 106 (e.g. one or more of a computer server, personal computer (PC), laptop, tablet, cellphone, network gateway, device (e.g., Internet of things), etc.) may connect with a network via a client endpoint 108.

The data collection system 104 may include a data extraction tool 110 and an event log database 112. The data extraction tool(s) 110 may be configured to passively monitor the endpoint 108 for events associated with users on the devices 106. In one embodiment, the term "passively monitor" may mean that data extraction tool 110 monitors endpoint 108 without any actions by the user or the client (e.g. the user does not have to initialize the data extraction tool). In one embodiment, the term "passively monitor" may mean that the data extraction tool 110 operates in the background of devices 106 and self initializes upon the powering on of devices 106. The data extraction tool 110 may be further configured to generate an event log based on the monitored events, which may be stored in the event log database 112. In some embodiments, the extraction tool 110 is a module or circuitry installed on the devices 106 or client endpoint 108, and configured to continuously monitor (e.g., via event logging) user activity on each of these components as discussed in greater detail herein. In other embodiments, the extraction tool 110 is part of a central server or gateway within the network of the client endpoint 108 that is configured to perform the monitoring of the devices 106 or client endpoint 108. For example, data extraction tool 110 may be a software application or hardware device stored on a user's device (i.e. device 106) capable of passively monitoring all of the user's activity on the user's device.

Each device 106 may be associated with a user, which may be identified by a user account accessed via a secure login. For example, when the endpoint client 108 is part of a corporate network or system, the user account may be an employee account of the corporate network that the employee accesses in the course of employment. The techniques discussed herein provide for programmatic computer behavior tracking and analysis for individual users, thereby providing techniques that protect electronic systems utilizing endpoints from behaviors such as intellectual property theft, confidential data leaks, fraudulent activity, malware, unauthorized access, and the like.

The analysis system 102 may include a behavioral engine 114, a scoring engine 116, a big data analytic tool 118, a score monitor ("monitor & incident response") 120, an IoB insider threat database 122, an IoB cybersecurity database 124, and one or more scoring databases 126.

The behavioral engine 114 may be configured to analyze the event log generated by the data extraction tool 110 and stored in the event log database 112. An event may include computer artifacts (e.g., machine behavior) and/or behavior artifacts (e.g., user behavior such as communications). The behavioral engine 114 may be configured to determine, based on the event log, indicators of behavior (IoB) along three factors or parameters of a "fraud triangle:" opportunity (O), pressure (P), and rationalization (R). The fraud triangle refers to a criminological model for occupational fraud that defines the O, P, and R parameters or behaviors. Subsequent to a user's activities being tracked and placed in the event log, the behavior engine 114 may be configured to: determine, based on the event log, an opportunity IoB for the user; determine, based on the event log, a pressure IoB for the user; and determine, based on the event log, a rationalization IoB for the user. In some embodiments, the behavioral engine 114 may be configured to access the IoB insider threat database 122 and the IoB cybersecurity database 124 to retrieve predefined IoBs based on the event log data. In one embodiment, the insider threat database 122 contains IoB's that are defined to detect insider threat attacks (e.g. employees of a company) and the cybersecurity database 124 contains IoBs that are defined to detect malware attacks. Thus, the two databases may contain distinct parameters for detecting different types of attacks. For example, the databases 122 and 124 may be configured to store IoB data defining O, P, and R behaviors, each behavior comprising one or more events (e.g., a sequence of monitored events). The events of each behavior may be referenced by the behavioral engine 114 to categorize events of the event log as belonging to the opportunity IoB, rationalization IoB, or pressure IoB. For example, the behavioral engine 114 may receive a particular event (e.g. a user accessing his email) and compare this event with the rules in one of the rule databases, such as the insider threat database 122 and/or the cybersecurity database 124 in order to determine if the event qualifies as an O, R, and/or P event. In one embodiment, the IoB data stored in databases 122 and 124 may be manually entered by a user with proper access control credentials. In other embodiment, big data analytics tool 118 may implement a machine learning technique to update and maintain IoB data stored in databases 122 and 124.

The scoring engine 116 may be configured to determine security risk scores for users based on the monitoring of events. The "security risk score" for a user refers to an overall measure of risk for the user. The security risk score may be determined based on a programmatic analysis of O, P, and R IoBs to determine the overall risk for the user. For example, the scoring engine 116 may be configured to:

determine, based on the opportunity IoB, an opportunity score; determine, based on the pressure IoB, a pressure score; and determine, based on the rationalization IoB, a rationalization score. The opportunity, pressure, and rationalization scores respectively provide a measure of a probability or likelihood of fraudulent activity based on the opportunity, pressure, and rationalization factors. The overall security risk score for the user may then be determined based on an algorithmic transformation of the opportunity, pressure, and rationalization scores, as discussed in greater detail herein.

In some embodiments, the scoring engine 116 may be configured to access the one or more scoring database 126 to retrieve scoring data that may facilitate the determination of O, P, and R scores, and/or the security risk score. The one or more databases 126 may include a fraud triangle analysis (FTA) database configured to store fraud analysis data, a cybersecurity database configured to store security user data for users (e.g., data relevant to criminal psychology statistics such as user position, associated scheme types, red flags, etc.), and a human resource database configured to store human resource data for users (e.g., name, position, age, gender, tenure, department, etc.). The scoring engine 116 may use the fraud analysis data, security user data, and human resource data to facilitate scoring of the O, P, and R IoBs as informed by perpetrator profiling and context from user communications (e.g., email and SMS texts using keywords combinations with fraud triangle analysis (FTA)).

The big data analytics tool 118 may be configured to provide analytics based on the scores output by the scoring engine 116 to indicate the risks such as cybersecurity attack, insider threat, occupational fraud and corporate auditioning in a standard format. The big data analytics tool 118 may be used to detect cybersecurity and insider threat incidents forensically, and provide inputs for (e.g., IoT) event logging. In some embodiments, the analytics tool 118 may be configured to utilize machine learning techniques to train a computer processor (e.g., neural network) to determine associations between security risk score inputs (e.g., O, P, and R IoBs) and output security risk scores. The analytics tool 118 may be further configured to support customizing the security risk scores for particular industry and business categories based on building the baselines for scoring standardizations, parameter weights, etc.

The score monitor 120 may be configured to monitor the security risk scores output by the scoring engine 116. The score monitor 120 may compare security risk scores for monitored users (or devices) and compare the scores with one or more security risk score thresholds. These thresholds may define security risk score values that may cause the score monitor 120 to generate outputs, such as reports or remedial actions.

In some embodiments, the various components of the analysis system 102 may be implemented on one or more servers and databases. The servers and/or databases may be connected with the data collection system 104 via a network (e.g., including a public network such as the Internet, or a private network).

The components (e.g., servers, databases, analysis system, data collection system, client endpoint, and the like) of the computing system 100 may be embodied by one or more devices, such as apparatus 200 shown in FIG. 2. As illustrated in FIG. 2, the apparatus 200 may include a processor 202, a memory 204, an input/output circuitry 206, and communications circuitry 208. The apparatus 200 may be configured to execute the operations described herein. Although these components 202-208 are described with respect to functional limitations, it should be understood that the particular implementations necessarily include the use of particular hardware. It should also be understood that certain of these components 202-208 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus 200. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

As described above and as will be appreciated based on this disclosure, embodiments of the present invention may be configured as methods, devices, backend network devices, servers, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Computer Behavioral Analysis

FIG. 3 shows a flow chart of an example of a method for securing a networked endpoint including one or more devices, in accordance with some embodiments. Method 300 is discussed herein as being performed by system 100, such as by one or more suitably configured servers, databases, analysis systems, endpoints, monitored devices, and the like.

Method 300 may begin at 302 and proceed to 304, where a data extraction tool 110 may be configured to monitor an endpoint 108 for events associated with a user on one or more devices 106. The data extraction tool 110 may be executing on the endpoint 108 and/or on the devices 106, or may be executing on a separate gateway or server connected with the endpoint 108 and devices 106.

FIG. 4 shows an example of event data structure 400, in accordance with some embodiments. Each event monitored by the data extraction tool may include event parameters defined by the event data structure to provide a standard system for logging. The event data structure may define a sequence number, a time/date of occurrence, endpoint information, process information (e.g., process ID (or "prsGID"), process attribute information), and event information (e.g., event type, event attributes). In one embodiment, process information may be information from an instance of a computer program that is being executed, such as program code and indication of current activity. In one embodiment, the prsGID may denote a collection of one or more processes. In one embodiment, process attributes may include memory information (location of executable code, call stack, virtual memory, heap, and the like), security attributes (owner and permissions access rules), processor states (register and physical memory addresses), and the like. As such, an event data structure can be used to define the events captured by the data extraction tool 110, and the data extra action tool 110 may capture these properties for each event to facilitate subsequent processing.

Now with returned reference to FIG. 3, at 306, the data extraction tool 110 may be configured to generate an event log based on the events. The event log provides a record of the monitored events, and may be stored in the event log database 112. FIG. 5 shows an example of an event log 500, in accordance with some embodiments. Event log 500 includes a listing of events, such as events A, B . . . C, etc., and the associated event data may be defined by the event data structure 400. As detailed in FIG. 4 each event (i.e. event A, B, and C) will have event information (i.e. event type and/or event attribute information). This event information is the basis for the IoB analysis.

FIG. 6 shows examples of monitored event information 600, in accordance with some embodiments. Event information 600 displays exemplary event types and event attributes in accordance with some embodiments. Some example event types that can be monitored may include a running process, a file access, a network access, activities, registry updates, privilege updates, clip board usage, or keyword searches on websites. Each event type may be associated with event attributes. For example, a running process may include a name, hash, PID, and GUID attributes. In another example, a file access may include a file name, folder, and hash attributes. Some other example event types and associated event attributes are shown in FIG. 6. The event attribute provides supplemental information about the event and are the parameters that are collected about each event. For example, in the case of a file access event, there may be attributes of: name of the file being accessed, identification of the folder that contains the file, hash value of the file being accessed. Each of these attributes may be significant to identify an event, a suspicious event, or a non-suspicious event. For example, a file name attribute of "COMPANY_SECRETS" may help indicate a suspicious event versus a file name attribute of "README."

Returning to FIG. 3, at 308-312, the behavior engine 114 may be configured to determine indicators of behavior (IoB s) along the opportunity (O), pressure (P), and rationalization (R) parameters of the fraud triangle based on the event log. The O IoB refers to behavior indicative of increased opportunity to perform fraudulent activity, the P IoB refers to behavior indicative of increased pressure to perform fraudulent activity, and the R IoB refers to behavior indicative of increased rationalization to perform fraudulent activity. As shown in the method 700 of FIG. 7, the behavior engine 114 may be configured to receive the event log from the data extraction tool 110 as an input (e.g., in response to a request, on a scheduled basis, or otherwise) at 702, and may process the event log based on IoB data (e.g., stored in IoB databases, such as the IoB insider threat database 122 and the IoB cybersecurity database 124) defining O, P, and R behaviors at 704. Each of the O, P, and R behaviors of interest may include one or more events (e.g., a predefined sequence of monitored events). In one embodiment, the behavior data engine 114 may match the received one or more events with stored events in the insider threat database 122 and/or the cybersecurity database 124. In another embodiment, the behavior data engine 114 may "reason" via formal logic matches between the received one or more events with stored events in the inside threat database 122 and/or the cybersecurity database 124. The behavior engine 114 may then be configured to generate an output of O, P, and R IoBs extracted from processing the event log at 706.

FIG. 8 shows examples of opportunity (O) IoBs 800, FIG. 9 shows examples of pressure (P) IoBs 900, and FIG. 10 shows examples of rationalization (R) IoBs 1000. Although not exhaustive examples, IoBs 800-1000 may be defined by IoB data stored in the IoB databases.

In some embodiments, the opportunity IoB may include one or more of: a user file download to a portable storage drive; a user access to sensitive data; a duplicate local storage of a network data resource; a failed login attempt; concurrently accessing multiple files; circumventing an audit process; a remote or oversea file transfer; an entry of a predefined opportunity keyword; or an access for fraud or destruction of evidence. The pressure IoB may include one or more of: an off-hour device usage; an entry of a predefined pressure keyword; an access to website with flagged pressure content; a website access frequency; or a device operation interruption. The rationalization IoB may include one or more of: an access to website with flagged rationalization content; an access for outside file sharing via a virtual private network (VPN); an entry of a predefined rationalization keyword; an access to website with flagged rationalization content; an access via private browsing; a download of a media file; a deleting of web history; a copying of a file to a local folder; a utilization of encryption software; or a screen capture with sensitive data file open.

In some embodiments, each O, P, and R IoB may be associated with a behavior time, such that a timeline or time series of the IoBs may be created. FIG. 11 shows examples of a time series of IoBs 1100, in accordance with some embodiments. The behavior time for an IoB may be determined based on the time and date of occurrence for one or more events that define the IoB. The behavior engine 114 may be configured to generate a timeline for each O, P and R IoB. Each IoB may be associated with a time stamp, and user/machine information. In some embodiments the time between events could be crucial to classing the behavior as malicious or non-malicious. For example, copying data to a USB stick 3 or more times within an hour suggests a potential malicious event (i.e. someone is copying a series of files). On the other hand, copying data to a USB stick 3 or more times in a week does not suggest the same level of risk.

Returning to FIG. 3, at 314-318, the scoring engine 116 may be configured to determine an opportunity (O) score, pressure (P) score, and rationalization (R) score for the user based on, respectively, the O IoB, P IoB, and R IoB. As shown in the method 1200 of FIG. 12, the scoring engine 116 may be configured to receive the O, P, and R IoBs from the behavior engine 114 as an input at 1202 and may process O, P, and R IoBs based on scoring data (e.g., stored in scoring databases 126, such as the FTA database, cybersecurity database, and human resource database) at 1204. In addition to the O IoB, P IoB, and RIoB, input 1202 may include a custodian (i.e. user) and/or machine identifier. In one embodiment, a custodian identifier may be username, email, and the like and a machine identifier may be a hardware identifier, IP address, and the like. The scoring data may define algorithmic relationships between the IoBs and the output O, P, and R scores. The scoring engine 116 may then be configured to generate O, P, and R scores as output at 1206.

In some embodiments, the scoring engine 116 may use the fraud analysis data, security user data, and human resource data to facilitate scoring of the O, P, and R IoBs as informed by perpetrator profiling and context from user communications (e.g., email and SMS texts using keywords combinations with fraud triangle analysis (FTA)). Stated another way, the scoring engine may use supplemental information aside from events captured in a user's log. For example, the scoring engine may perform a context search through a user's human resource file for various keywords (e.g. "warning", "harass", "violation", etc.) to further raise or lower the user's O, P, R score.

Some embodiments may apply context and relation of dissimilar computer events that, when occurring together, indicate computer behavior with greater accuracy. For example, a combination of printing events (i.e. printing a file) and USB copying events (i.e. saving the file) within a short period of time may elevate a risk score. The result provides a predictive model to detect computer or user activity that warrants a manual inspection or examination to validate or refute the results of the analytic process. In some embodiments, the final result of the analytic methodology categorizes behaviors into related grouping and subsequently extrapolate centrality, volatility and bumpiness for each behavior (i.e. O behaviors, P behaviors, or R behaviors) that when combined with other behaviors (e.g. O behaviors combined with P behaviors, R behaviors combined with O behaviors, and the like) will result in a risk score or probability.

Context refers to the process of considering the significance of a single event that when collected, aggregated, collated and related to other dissimilar activity/events will indicate patterns. When analyzed in conjunction with other entirely separate events (potentially in the hundreds or thousands of behaviors), it is possible to derive an accurate probability of suspicious behavior across all recorded behaviors. By charting identical events using a measured statistical mean average, combined with periodicity (time) of event occurrence, it is possible to reveal a variance used to determine the dynamic weight. Event groupings (a compilation of events across a numerical and time graph) result in an "Indicator of Behavior (IOB)". In one embodiment, the term "identical events" may be the same event. For example, for a first printing event, an identical event may simply be another print event regardless if the print event is for a different document or for a different printer.

Some embodiments may use multiple stages to derive resultant security risk scores. A combination of mathematical algorithms and Bayesian statistics may be used to define the weight of an IoB. Each IoB, even those of similar groupings, will change according to the inputs and definitions. The ultimate outcome, when converging separate IoBs, enables a cyclic and self-correcting machine learning methodology that becomes more accurately measured as recorded metrics increase.

The metrics that may be used in determining the dynamic weight or value of identical IoB are represented as inputs to an algorithm as Centrality (yAverage), Volatility (rVariance) and Bumpiness (xTime).

"Centrality" is the statistical norm or average of identical recorded events. Centrality is a cyclic counter of identical events that are enumerated, stored and reset at fixed intervals. The cyclic counter is used as an input to the algorithm engine.

"Volatility" is the variance from historic and statistical mean averages. Volatility is the percentage of deviation from the dynamic threshold as determined by the computed weights of Volatility and Bumpiness or as singular fixed values determined or provided from preexisting profiles (fixed numeric and time values). Each Indicator of Behavior will have dynamic weights which are applied as inputs to secondary analytic processes and methods.

"Bumpiness" is the periodicity of identical events recorded as a cyclic pattern across the time. As every identical event is numerically counted for Centrality, Bumpiness is a time metric that measures time between recorded events within a fixed cycle, stored as a time interval between event occurrences. Centrality, or the number of events recorded during a known sample period, acts as an input in the time domain. Centrality, Volatility, and/or Bumpiness in some embodiments, may be used to modify the weights of certainty events after security incidents occur.

The derived weight of each individual IoB, may be stored and used as inputs to the scoring algorithm to derive security risk scores. The algorithm may be constructed so that it is not reliant upon a weight from each IoB, rather, for example, if only 5 of 100 possible IoBs have resultant recorded weights, the algorithm will not implode and deliver a null value. This requires a computation of IoB inputs and a variable to account for reduced IoBs. Risk probability will naturally be increased as the number of supplied IoBs increases, however the methodology is not wholly reliant on the presence of every IoB possible. Furthermore, as additional IoBs are created, the Risk scoring algorithm is sufficiently dynamic to accept additional calculations.

FIG. 13 shows examples of security user data 1300 that may be stored in security database 126, in accordance with some embodiments. The security user data 1300 may include user data that is relevant under criminal psychology principles of fraud, such as a user's position, tenure, age, gender, history, etc. Risk by category may include a normalized score of fraud incidences per category population size. For, example fraud incidences indicate that when insider fraud occurs then 42% of the time it is by a regular employee, 36% of the time it is by a manager and 19% of the time it is by an owner/executive. In this example an employee is any employee or contractor of a company that is not a manager or an owner/executive. FIG. 14 shows examples of human resource data 1400, in accordance with some embodiments. The human resource data 1400, stored in security database 126, may include human resource data of the user, such as may be kept by the user's employer or organization. Risk by category may include a normalized score of fraud incidences per category population size. The security user data 1300 and human resource data 1400 may be accessed by the scoring engine 116 to facilitate determination of the O, P, and R scores based on the O, P, and R IoBs. In another embodiment, risk by category may be used to determine a user risk profile weighted score based on the risk profile weight and a user risk score. This functionality is described in more detail by FIGS. 16A-C and 17.

Returning to FIG. 3, at 320, the scoring engine 116 may be configured to determine a security risk score for the user based on the opportunity (O) score, pressure (P) score, and rationalization (R) score. The security risk score refers to an overall measure of risk for a user, and may be determined based on algorithmic transformation of one or more O scores, P scores, and R scores tracked over time. In some embodiments, the security risk score may be based on a combination and/or (e.g., weighted) average of the O, P, and R scores associated with the user. Each O, P, and R category scores are individually aggregated, and may be totaled together. The category subtotal can be weighted by historical data, and then summarized into the total data. The weightings may be predefined values, which in some embodiments may be determined using machine learning techniques and event log training sets.

Returning to FIG. 3, at 322, the score monitor 120 may be configured to determine a security risk score threshold. The security risk score threshold may define a value for the security risk score that is deemed sufficiently high risk to initiate a remedial action. The security risk score threshold may be a predefined value, and may be set higher or lower to adjust the sensitivity of the behavioral analysis. The security risk score threshold may be manually set and may be tailored to customer specific needs. Furthermore the security risk threshold may not require a total score but may only look to one of the opportunity score, pressure score, or rationalization score alone to determine the security risk threshold. For example, in one instance the security risk score threshold may require a total score of over 1.0. This may be achieved by a score of 0.5 in opportunity, 0.4 in pressure, and 0.3 in rationalization. In another example, the security risk score threshold may require only the pressure score to be over a certain number. In such case it may be irrelevant to the opportunity and rationalization scores. In another example, the security risk score threshold may require each of the opportunity, pressure, and rationalization scores to be at a certain level (e.g. all must be above 0.5).

In response to determining that the security risk score does not exceed the risk score threshold, method 300 may return to 304, where the endpoint and connected devices may continue to be monitored for events. Method 300 may be repeated to provide continuous monitoring of the endpoint and devices.

Returning to 324, in response to determining that the security risk score exceeds the security risk score threshold, method 300 may proceed to 326, where the score monitor 120 may be configured to generate an alert. The alert may be provided electronically using any suitable technique such as email, application alert, text message, etc. to a fraud analyst, system administer, or the like. The alert may include a message with an indication of the security risk score, as well as the behaviors, events, timelines, etc. which caused the alert to trigger.

At 328, the big data analytics tool 118 may be configured to provide analytics based on the O, P, R, and/or security risk scores output by the scoring engine 116. The analytics may be used in combination with a keyword analysis, such as from emails or other communications by users. Fraud detection can be significantly increased by using algorithms and Bayesian statistics on structured data to measure probability, which can then trigger keyword searches of unstructured data which typically otherwise would be manually impossible or impracticable. In addition, the process of scanning structured repositories is computationally heavy on resources and often time requires the searching of very large data sets, with a high incidence of false positives. The described invention provides plenty of advantages over known fraud detection systems. For example, the invention allows for a two filter system for determining fraud detection. First, structured data related to a user may be analyzed to determine if the user is potentially a security risk. Second, unstructured data related to the user may be analyzed to confirm if the user is a security risk. Prior systems do not use this filtered approach and instead rely upon just doing an unstructured data search. However, by applying the described filtering system, computer systems are able to run more efficiently because performing unstructured data analysis is more computationally expensive than performing structured data analysis. The filter system described herein allows a small pool of data to be analyzed by the unstructured analysis due to the first step of filtering potential security risks according to structured data analysis. The use of IoB analysis discussed herein provides improvements to real-time computations speeds, lower processing loads, and more accurate threat detection than conventional keyword analysis.

In some embodiments, the analytics tool 118 may be configured to facilitate machine learning to train the scoring engine 116 to determine the O, P, R, and security risk scores based on the inputs discussed herein (e.g., event logs, fraud analysis data, security user data, and human resource data). Training data sets may be generated with example inputs and an associated result (e.g., high risk or low risk), and used to train a neural network to determine relationships between the inputs and outputs of the scoring engine 116. The analytic tool 118 may be configured to determine, based on the training data, algorithmic relationships between the opportunity IoB and the opportunity score, the pressure IoB and the pressure score, and the rationalization IoB with the rationalization score. The analytic tool 118 may be further configured to determine, based on training data, algorithmic relationships between the opportunity score, pressure score, and rationalization score with the security risk score.

In some embodiments, analytics tool 118 may be configured to provide analytics based on the scores output by the scoring engine 116 to indicate the risks such as cybersecurity attack, insider threat, occupational fraud and corporate auditioning in a standard format and/or to detect cybersecurity and insider threat incidents forensically, and provide inputs for (e.g., IoT) event logging. In some embodiments, the analytics may further provide for additional human or computer behaviors, or combination of thereof, of interest for event logging. Method 300 may then proceed to 330 and end.

FIG. 15 illustrates exemplary embodiment 1500 which is an example of process 300. Exemplary embodiment 1500 will be described with reference to both FIGS. 15 and 3. After the data extraction tools monitor a user's device to develop an event log (i.e. 302-306), the behavioral engine will determine an opportunity IoB, pressure IoB, and rationalization IoB of the user (i.e. 308-312). As described above, the behavioral engine determines each IoB of the user based on information stored in the insider threat database 122 and/or the cyber security database 124. The result of 308 is illustrated by opportunity/access data 1502, the result of 310 is illustrated by pressure/activity data 1504, and the result of 312 is illustrated by rationalization/action 1506. 1502-1506 illustrates examples of events for their respective categories. For example, item 3 of opportunity/access data 1502, indicates an opportunity IoB for the user plugging in 2 separate times a USB drive. In another example item 12 of rationalization/action data 1506, indicates a rationalization IoB for the user printing 12 files.

Once the IoBs have been indicated, an opportunity score, pressure score, and rationalization score are calculated (i.e. 314-318). As described above, the scoring engine determines a score for each indicated IoB based on information in the scoring database 126. Each particular event may have a different value associated with it. For example, item 1 of opportunity/access data 1502, indicates a user logs on to Finance/Accounting server and Human Resources server, the scoring engine determines that this action has score of 0.3. In contrast, item 2 of opportunity/access data 1502, indicates a user logs onto Facebook and Twitter and LinkedIn, but this action has a score of 0.1. The scores may differ depending on the perceived or statistical value of each action as it relates to determining a security risk. The scores may vary based on client needs and/or industry practices. In this example, item 1 is a higher security risk than item 3, thus the scoring for item 1 is higher than for item 3. In one embodiment, the scoring database 126 may update the scoring of events based on past users who were found to be security threats (i.e. statistical analysis). For example, item 1 may be valued higher than item 3 because in the past there were several users who were found to be security threats that performed the action in item 1 versus a minimal amount of users who were found to be security threats that performed the action in item 3. In another example, item 1 may be proportionally moved up in value (e.g. from 0.1 to 0.2) once a certain amount of users (e.g. 10) have performed the action in item 1 and been deemed a security risk. Consequently, using the concept of the same concept of Centrality as described above, item 1 may be proportionally moved down in value (e.g. from 0.2 to 0.1) if over a certain amount of time (e.g. 2 months) a certain amount users (e.g. 10) have performed the action in item 1 and have not been deemed a security risk. This process may act as a basic machine learning function such that process 300 is able to keep up with current trends in security risks. In one embodiment, for the purposes of the machine learning algorithm a user may be determined to be deemed a security risk if the user's OPR risk score 1514 is "red" or if the user risk score 1520 for the user is "red." This allows the machine learning algorithm to use either calculated score for its machine learning.

Once each event is given a particular score the events from the same IoB are aggregated together to come to a total. For example the rationalization/action data 1506 has a total of 0.8, which has a "red" level. Similar to the scoring, the levels may be customized to fit a particular client's need. In this particular example, a level of "green" means low risk and is between 0 and less than 0.5, a level of "yellow" means medium risk and is greater than or equal to 0.5 and less than or equal to 0.7, and a level of "red" means high risk and is for any value greater than 0.7. The levels provide a quick identification of the security threat.

After the opportunity score, pressure score, and rationalization score have been determined (i.e. 314-318), the scoring engine in combination with the big data analytics tool can calculate a security risk of the user and a security risk threshold (i.e. 320-322). OPR algorithm 1510 is one such way to determine a user's security risk score (i.e. 320). OPR algorithm 1510 uses the overall scores from each of 1502, 1504, and 1506 along with a weight of each IoB to calculate OPR score 1514 and the corresponding level. Risk score weight table 1512 is an example of the weights associated with each IoB used in OPR algorithm 1510. Weight table 1512 shows the score from 1502 has a weight of 25%, the score from 1504 has a weight of 30% and the score from 1506 has a weight of 45%. The weight values may be set manually according to a client's needs or industry. In another embodiment, the weight values may implement a similar learning technique to those described for the scoring system (i.e. proportionally increase weights that tend show users are security risk, while proportionally decreasing other weights). OPR algorithm 1510 uses the formula (access weight*overall score from 1502)+(activity weight*overall score from 1504)+(action weight*overall score from 1506), which results in an OPR score of 0.73 and a level of "red." The level of OPR score 1514 indicates that there is there is a high security risk. Next, the OPR score 1514 is compared to a security risk threshold score (i.e. 324). This security risk threshold score may be an actual value (e.g. greater than or equal to 0.51) or it may correspond to a level (e.g. "red" level). In this particular example, the security risk threshold corresponds to the "red" level. The "red" level indicates that the OPR score 1514 has exceeded the threshold and thus an alert is sent (i.e. 326) and keyword analytics are performed (i.e. 328).

After it has been determined that OPR score 1514 exceeds the threshold, user risk score algorithm 1516 will be implemented to gain a final risk assessment. Search and website data 1508 is similar to datasets 1502-1506 in that an event is identified that may be a security risk and a score is designed to each event and a total value and level is calculated. The main difference between datasets 1502-1506 and 1508 is that 1502-1506 may be determined using user log data, which is structured data. On the other hand, dataset 1508 is created from a keyword based search on unstructured data such as a user's input for URL's, search terms, copied text (e.g. copy and paste, copy to clipboard, etc.) and the like. Keyword search can be done by brute-force string matching of a list of relevant keywords to textual data. For example, if a user opens a browser and types "www.gambling.com" into the URL line and subsequently entered that website, then this computer event would be recorded. The text from this recorded event can then be matched to a list of previously identified keywords to determine dataset 1508. This same keyword search process can be applied to terms appearing in a user's clipboard that may be copied from a variety of sources.

Weight table 1518 shows OPR score 1514 has a weight of 75% and the score from 1508 has a weight of 25%. The weight values may be set manually according to a client's needs or industry. In another embodiment, the weight values may be determined by a similar learning technique to those described for the scoring system (i.e. proportionally increase weights that tend to show users are security risk, while proportionally decreasing other weights). User risk score algorithm 1516 uses the formula (OPR weight*OPR 1514)+(search and website weight*overall score from 1508), which results the user risk score 1520 being 0.67 and a level of "yellow." In one embodiment, the result of OPR algorithm 1510 (i.e. OPR score 1514) is always weighted more than the total of dataset 1508. Similar to weight table 1512, weight table 1518 may be configured based on client needs and/or industry standards. By using the weights in weight table 1518 process 300 is able to more accurately determine if a user is a threat. As can be seen in 1500, originally OPR 1514 (i.e. 324) indicates that a user is a very high security risk, but once the unstructured analysis is performed it can be concluded that the user is in fact not as high of a risk as previously indicated. This two tiered data analysis process produces a more accurate security threat assessment. In an alternate embodiment, the analysis of unstructured data may be performed before the analysis of structured data, as this still allows for a two filter approach which increases accuracy of security threat assessment.

After user risk score 1520 has been calculated it is possible for scoring engine 116 and/or big data analytics tools 118 to further calculate a user risk profile weighted score based on a risk profile weight and user risk score 1520. In order to determine the user risk profile weighted score, a baseline risk profile is first established. A baseline risk profile is a set type of categories and frequencies for an ideal insider threat. The categories are modifiable based on client demand and/or industry demands. FIG. 17 illustrates exemplary dataset 1700 for categories along with their frequencies. Frequencies are the statistical likelihood of that category being associated with an insider fraud/threat. For example the category "tenure" may be broken down into sub categories of: less than one year, 1 to 5 years, 6 to 10 years, and greater than 10 years. Through statistical analysis, in this example, it has been determined that for less than one year there is a 6.8% frequency or likelihood of insider fraud when compared to the other age groups. Likewise, for someone who has been working at a company for 6-10 years there is a 27.3% frequency or likelihood of insider fraud when compared to the other age groups. The statistical analysis performed to determine the frequency value may take many forms. In one embodiment, the frequency values may be set by an authorized user. In another embodiment, the frequency values may be enterprise (e.g. company, business, corporation, and the like) specific such that the frequency values are determined by looking at the profiles of past confirmed insider threat or frauds for that particular enterprise. For sake of simplicity, profiles in this sense look at the categories of position, gender, tenure, age, and department. It is within the scope of this disclosure to modify those categories. In another embodiment, the frequency values may be determined by a $3^{rd}$ party by looking at profiles of past confirmed insider threats or frauds across different and distinct enterprises. For example, several data analysis and data collection systems may displaced at different enterprises. Whenever there is a confirmed insider fraud or threat, this information along with the corresponding user's profile data may be kept in a database (e.g. insider threat database 122). Over time user profile data of confirmed insider threats or fraud may be analyzed to determine the frequency values. This process can be similar to the process described in paragraph 74 for updating weight values.

Based on the exemplary categories in FIG. 17, FIG. 16A illustrates an exemplary baseline risk profile 1600. FIG. 16A comprises of all of the highest frequency items from each category, thus making it the most likely profile to be an insider threat. From this data a profile risk score is calculated by multiplying all of the frequency values together (i.e. 0.42*0.67*407*0.1810*0.1740=0.0036070015). This value will set the highest profile risk score field, as it is the highest possible score. The profile in FIG. 16A has a normalized risk score of 100%, this number may be used to modify user risk score 1520 to determine a user risk profile weighted score. In one embodiment, this modification is simple multiplication, but the invention is not limited to only multiplication. The intent is to modify the user risk score according to statistical profile information in order to more accurately determine if a user is a threat. FIGS. 16B and 16C further detail this intent.

FIGS. 16B and 16C illustrate user risk profile 1602 and user risk profile 1604 respectively. For sake of simplicity the risk profile shown in FIG. 16B will be for user "Beth" and the risk profile shown in FIG. 16C will be for user "Chad." Beth and Chad have the same categories for their risk profiles. The highest profile risk score for both Chad and Beth are based on the baseline risk profile shown in FIG. 16A. Both Beth and Chad's profile risk score are determined by multiplying together all of their respective frequencies. However, when compared to the highest profile risk score (from FIG. 16A) Chad has a lower normalized risk score (i.e. risk profile weight) than Beth. This is because Chad's profile data indicates that he is less likely to be an insider threat than Beth. In this example, it can be seen that the fact that Chad is in the legal department greatly reduces the likelihood that Chad is an insider threat, as members of the legal community are statistically less likely to commit fraud. In the situation where Chad and Beth have equal user risk scores (see FIG. 15) then using Chad's and Beth's risk profile weight it can be determined that Beth is more likely to be a threat. As stated previously, the intent of the risk profiles is to use statistical data to better assess a threat. In some embodiments, the risk profile weight may be used to modify the OPR risk score 1514 instead of the user risk score 1520. By using the risk profile weight to modify the OPR risk score, it can be determined with more certainty if a user is more likely to be a fraud, before determining the user risk score calculation. This allows the pool of users that undergo the $2^{nd}$ analysis (i.e. keyword search of unstructured data) to be more likely to be insider threats, thus computer resources are more efficiently used.

Although the description often refers to determining insider fraud or insider threat, the concepts described herein may be used to find outsider fraud and outsider threats using similar technology and processes.

Aside from a more accurate security threat assessment, this disclosure improves the efficiency of computer systems. The analysis of unstructured data typically takes longer and is more computationally expensive than the more passive analysis of structured data. By performing structured data analysis prior to the unstructured data analysis, an improvement is made to the efficiency of security detection systems, because there is no need to perform the computationally expensive unstructured search on all users. Instead the computationally expensive unstructured analysis is only performed on users who first are identified as security risk by the less computationally expensive structured analysis.

CONCLUSION

Many modifications and other embodiments will come to mind to one skilled in the art to which these embodiments pertain having the benefit of the teachings presented in the foregoing descriptions and the associated drawings. Therefore, it is to be understood that embodiments and implementations are not to be limited to the specific example embodiments disclosed and that modifications and other embodiments are intended to be included within the scope of the appended claims. Although specific terms are employed herein, they are used in a generic and descriptive sense only and not for purposes of limitation. For example, throughout the application it is stated that a security risk for a user is determined. However, the user may be an actual device instead of a human being.

That which is claimed:

1. A system for securing a networked endpoint connected with one or more devices, comprising:
    a data collection device and an analysis device;
    the data collection device, comprising instructions stored in a non-volatile data collection device memory that when executed by a data collection device processor configure the data collection device to:
        passively monitor, the one or more devices associated with a user;
        create, an event log based on the monitored one or more devices, wherein the event log includes events associated with the user;
    the analysis device, comprising instructions stored in a non-volatile analysis device memory that when executed by an analysis device processor configure the analysis device to:
        determine, based on accessing the event log, an opportunity indicator of behavior (IoB) for the user;
        determine, based on the event log, a pressure IoB for the user;
        determine, based on the event log, a rationalization IoB for the user;
        determine, based on the opportunity IoB, an opportunity score;
        determine, based on the pressure IoB, a pressure score;
        determine, based on the rationalization IoB, a rationalization score;
        determine a security risk score, for the user based on the opportunity score, the pressure score, and the rationalization score;
        determine a security risk score threshold;
        determine whether the security risk score exceeds the security risk score threshold, and in circumstances that the security risk score exceeds the security risk score threshold, the analysis device is further configured to:
        access search and website data associated with the user, wherein the search and website data comprises a result of a keyword-based analysis of unstructured data related to the user;
        determine, based on the search and website data, a search and website data score;
        determine, a user risk score for the user based on the security risk score and the search and website data score;
        compare, the user risk score to a final security risk score threshold, to determine if the user is a security threat.

2. The system of claim 1, wherein the analysis device is further configured to:
    determine an opportunity weight;
    determine an pressure weight;
    determine a rationalization weight; and
    determine an OPR score based on the opportunity score, the opportunity weight, the pressure score, the pressure weight, the rationalization weight, and the rationalization score.

3. The system of claim 1, wherein the analysis device is further configured to:
    determine a search and website weight;
    determine a security risk score weight; and
    determine the user risk score based on the search and website weight, the search and website data score, the security risk score weight, and the security risk score.

4. The system of claim 3, wherein the security risk score weight is greater than the search and website data weight.

5. The system of claim 1, wherein:
    the opportunity IoB includes one or more of:
        a user file download to a portable storage drive;
        a user access to sensitive data;
        a duplicate local storage of a network data resource;
        a failed login attempt;
        concurrently accessing multiple files;
        circumventing an audit process;
        a remote or oversea file transfer;
        an entry of a predefined opportunity keyword; and
        an access for fraud or destruction of evidence.

6. The system of claim 1, wherein:
    the pressure IoB includes one or more of:
        an off-hour device usage;
        an entry of a predefined pressure keyword;
        an access to website with flagged pressure content;
        a website access frequency; and
        a device operation interruption.

7. The system of claim 1, wherein:
the rationalization IoB includes one or more of:
- an access to website with flagged rationalization content;
- an access for outside file sharing via a virtual private network (VPN);
- an entry of a predefined rationalization keyword;
- an access to website with flagged rationalization content;
- an access via private browsing;
- a download of a media file;
- a deleting of web history;
- a copying of a file to a local folder;
- a utilization of encryption software; and
- a screen capture with sensitive data file open.

8. The system of claim 1, wherein the analysis device is further configured to:
- determine a baseline risk profile;
- determine a first user risk profile for a user associated with the user risk score;
- determine a user risk profile weight based on the first user risk profile and the baseline risk profile;
- determine a user risk profile weighted score based on the risk profile weight and the user risk score.

9. The system of claim 8, wherein the baseline risk profile comprises categories and frequencies, wherein the frequencies are statistical probabilities of insider fraud for each category.

10. The system of claim 9, wherein the baseline risk profile is determined based on data from confirmed insider threats from multiple enterprises.

11. An analysis device for securing a networked endpoint connected with one or more devices, comprising:
processing circuitry configured to:
- receive an event log for the one or more devices, wherein the event log includes events associated with a user of the one or more devices;
- determine, based on accessing the event log, an opportunity indicator of behavior (IoB) for the user;
- determine, based on the event log, a pressure IoB for the user;
- determine, based on the event log, a rationalization IoB for the user;
- determine, based on the opportunity IoB, an opportunity score;
- determine, based on the pressure IoB, a pressure score;
- determine, based on the rationalization IoB, a rationalization score;
- determine a security risk score, for the user based on the opportunity score, the pressure score, and the rationalization score;
- determine a security risk score threshold;
- determine whether the security risk score exceeds the security risk score threshold, and in circumstances when the security risk score exceeds the security risk score threshold, the processing circuitry is further configured to:
access search and website data associated with the user, wherein the search and website data comprises a result of a keyword-based analysis of unstructured data related to the user;
- determine, based on the search and website data, a search and website data score; and
a scoring engine configured to:
- determine, a user risk score for the user based on the security risk score and the search and website data score; and
compare, the user risk score to a final security risk score threshold, to determine if the user is a security threat.

12. The analysis device of claim 11, wherein the processing circuitry is further configured to:
- determine an opportunity weight;
- determine an pressure weight;
- determine a rationalization weight; and
- determine an OPR score based on the opportunity score, the opportunity weight, the pressure score, the pressure weight, the rationalization weight, and the rationalization score.

13. The analysis device of claim 11, wherein the processing circuitry is further configured to:
- determine an search and website weight;
- determine a security risk score weight; and
the scoring engine is further configured to:
- determine the user risk score based on the search and website weight, the search and website data score, the security risk score weight, and the security risk score.

14. The analysis device of claim 13, wherein the security risk score weight is greater than the search and website data weight.

15. The analysis device of claim 11, wherein:
the opportunity IoB includes one or more of:
- a user file download to a portable storage drive;
- a user access to sensitive data;
- a duplicate local storage of a network data resource;
- a failed login attempt;
- concurrently accessing multiple files;
- circumventing an audit process;
- a remote or oversea file transfer;
- an entry of a predefined opportunity keyword; and
- an access for fraud or destruction of evidence.

16. The analysis device of claim 11, wherein:
the pressure IoB includes one or more of:
- an off-hour device usage;
- an entry of a predefined pressure keyword;
- an access to website with flagged pressure content;
- a website access frequency; and
- a device operation interruption.

17. The analysis device of claim 11, wherein:
the rationalization IoB includes one or more of:
- an access to website with flagged rationalization content;
- an access for outside file sharing via a virtual private network (VPN);
- an entry of a predefined rationalization keyword;
- an access to website with flagged rationalization content;
- an access via private browsing;
- a download of a media file;
- a deleting of web history;
- a copying of a file to a local folder;
- a utilization of encryption software; and
- a screen capture with sensitive data file open.

18. The analysis device of claim 11, wherein the processing circuitry is further configured to:
- determine a baseline risk profile;
- determine a first user risk profile for a user associated with the user risk score;
- determine a user risk profile weight based on the first user risk profile and the baseline risk profile;
- determine a user risk profile weighted score based on the risk profile weight and the user risk score.

19. The analysis device of claim 18, wherein the baseline risk profile comprises categories and frequencies, wherein the frequencies are statistical probabilities of insider fraud for each category.

20. The analysis device of claim 19, wherein the baseline risk profile is determined based on data from confirmed insider threats from multiple enterprises.

\* \* \* \* \*

UNITED STATES PATENT AND TRADEMARK OFFICE
CERTIFICATE OF CORRECTION

PATENT NO. : 10,178,116 B2
APPLICATION NO. : 15/445883
DATED : January 8, 2019
INVENTOR(S) : Fujisawa et al.

Page 1 of 1

It is certified that error appears in the above-identified patent and that said Letters Patent is hereby corrected as shown below:

On the Title Page

(72) Inventors: Cheree James, Tokyo (JP):
Delete "Tokyo (JP)" and insert --Los Angeles, CA (US)--

Signed and Sealed this
Twenty-sixth Day of February, 2019

Andrei Iancu
*Director of the United States Patent and Trademark Office*